(No Model.)

W. A. JENNINGS.
Clevis.

No. 235,248. Patented Dec. 7, 1880.

WITNESSES:
H. B. Brown
W. H. Rowe

INVENTOR:
Wm. A. Jennings
BY
ATTORNEYS.

UNITED STATES PATENT OFFICE.

WILLIAM A. JENNINGS, OF DYERSBURG, TENNESSEE, ASSIGNOR OF ONE-HALF TO SAMUEL R. LATTA, OF SAME PLACE.

CLEVIS.

SPECIFICATION forming part of Letters Patent No. 235,248, dated December 7, 1880.

Application filed September 18, 1880. (No model.)

*To all whom it may concern:*

Be it known that I, WM. ANDREW JENNINGS, of Dyersburg, in the county of Dyer and State of Tennessee, have invented a new and Improved Plow-Clevis; and I do hereby declare that the following is a full, clear, and exact description of the same.

My invention relates to a clevis for plows, harrows, and other agricultural implements that may be adjusted to fit draw-beams of various dimensions, in order that it may be applied to any of the said implements upon a form in a simple, convenient, and effective manner; and the improvement consists, first, in a clevis formed of two bars hinged to the ends of a link and connected with each other by a bolt hinged to one of them, and adjustably connected to the other, so that the bars may be held at any required position from each other to embrace and fit the opposite sides of the beam, the link-piece being provided with suitable means for connecting the clevis to the single or double tree.

Figure 1:
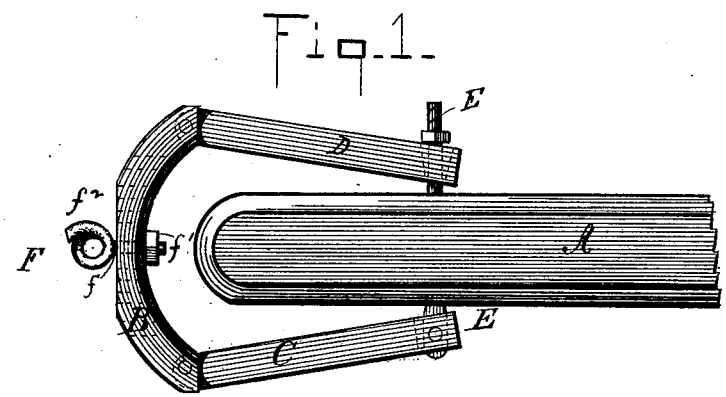
Figure 2:
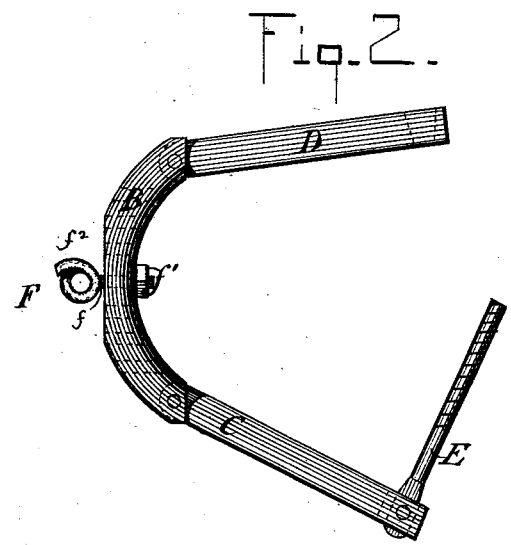

In the accompanying drawings, Figure 1 is a side elevation of the clevis attached to the beam of a plow; and Fig. 2 is a similar view of the clevis detached and opened out ready for attachment.

The plow-beam A is broken off, and is, in this instance, perforated from top to bottom in a well-known manner, through which perforation the bolt of the clevis may pass. The clevis is formed of a link-piece, B, to each end of which is hinged, respectively, one of the ends of the bars C D. The other end of the bar C is hinged to the end of a bolt, E, and the corresponding end of the bar D is provided with an opening, through which the free end of the bolt E may pass.

The free end of the bolt E is screw-threaded to receive a nut, by which means, when the end of the bolt is passed through the bar D, the nut may be adjusted upon the bolt and serve to regulate the distance of the rear ends of the bars C D from each other.

Instead of the screw thread and nut upon the end of the bolt E, the bolt may be perforated and a pin or leather strap may be passed through one or other of the perforations to make the adjustment.

The clevis may, by the above-described means, be made to fit beams of different sizes within reasonable limits, and may be readily applied to the different cultivating-machines upon a farm upon which such devices are employed.

The link portion B of the clevis may be attached to the swivel-tree in any well-known manner, but is preferably provided with a series of holes that pass through it one above the other, by which means a swivel-shanked hook, F, of peculiar construction, may be attached.

The hook F is provided with a shank, *f*, that passes freely through one of the perforations in the link B, so that it may be swiveled therein, and is retained in place by a head, *f'*, formed upon its end.

The hook F is curled or twisted to form an open link portion, $f^2$, into which the loop of the single or double tree may be directly attached without the intervention of open rings or links, and will form a swivel-connection between the single or double tree and the beam, to admit of their being at all times held in a horizontal position.

The hook F may be removed from the link by slightly opening or spreading the coils of the hooked portion $f^2$, or the head *f'* may be removable, by which means the hook F may be readily placed in any one of the holes in the link to regulate the depth to which the plow is to run.

The various parts of the clevis, including the bolt, are connected together in a permanent manner, so that there is no danger of their being separated from each other and lost.

The clevis may be applied to the beam horizontally, perpendicularly, or diagonally, and either in front or top, or under the beam, as may be found most convenient.

What I claim as new is—

A plow-clevis formed of the combination of the link-piece B, the bars C D, hinged thereto, and the bolt E, hinged to one of the bars and adjustably connected with the other, substantially as and for the purpose described.

WILLIAM ANDREW JENNINGS.

Witnesses:
F. G. SAMPSON,
CHAS. C. MOSS.